United States Patent [19]

Turina

[11] Patent Number: 5,784,362
[45] Date of Patent: Jul. 21, 1998

[54] TEMPORARY FRAME IDENTIFICATION FOR ARQ IN A RESERVATION-SLOTTED-ALOHA TYPE OF PROTOCOL

[75] Inventor: Dalibor Turina, Täby, Sweden

[73] Assignee: Telefonaktiebolaget LM Ericsson, Stockholm, Sweden

[21] Appl. No.: 422,790

[22] Filed: Apr. 17, 1995

[51] Int. Cl.$^6$ .................................................. H04J 3/16
[52] U.S. Cl. ..................................... 370/321; 370/471
[58] Field of Search ........................ 370/95.1, 95.2, 370/95.3, 60, 60.1, 94.1, 94.2, 79, 80, 82, 85.7, 85.8, 216, 237, 348, 349, 389, 404, 458, 459, 465, 468, 471, 475, 915, 310, 321, 337, 347, 346; 379/59, 60; 455/33.1, 54.1, 54.2, 56.1, 422, 524, 525; 178/4.1 C, 69 L; 371/32, 33, 34; 395/180, 181

[56] References Cited

U.S. PATENT DOCUMENTS

| | | | |
|---|---|---|---|
| 4,887,265 | 12/1989 | Felix | 370/94.1 |
| 4,916,691 | 4/1990 | Goodman | 370/60 |
| 5,068,916 | 11/1991 | Harrison et al. | 370/100.1 |
| 5,228,029 | 7/1993 | Kotzin | 370/95.1 |
| 5,373,503 | 12/1994 | Chen | 370/95.2 |

FOREIGN PATENT DOCUMENTS

| | | |
|---|---|---|
| 33 122 | 1/1981 | European Pat. Off. . |
| 544 464 | 6/1993 | European Pat. Off. . |
| 577 959 | 1/1994 | European Pat. Off. . |
| 616 480 | 9/1994 | European Pat. Off. . |
| WO93/16547 | 8/1993 | WIPO . |
| WO94/21090 | 9/1994 | WIPO . |

OTHER PUBLICATIONS

S. Onoe et al., "Radio Link Control Techniques for Digital Cellular Systems" NTT Review, vol. 4, No. 1 (Jan. 1, 1992).
K. Felix, "Packet Switching in Digital Cellular Systems", *IEEE*, 1988, pp. 414–418.
"Cellular Digital Packet Data System Specification", vol. 1, System Overview, Release 1.0, Jul. 19, 1993, pp. 100-1-101-18.
Decker, "Packet Radio in GSM", Tech. Doc. SMG 4 58/93, *European Telecommunications Standards, Institute (ETSI)*, Feb. 12, 1993, pp. 1–13 (odd only).
Decker et al., "A General Packet Radio Service Proposed for GSM", Aachen University of Technology, Oct. 13, 1993, pp. 2–20 (even only).

(List continued on next page.)

*Primary Examiner*—Dang Ton
*Attorney, Agent, or Firm*—Burns, Doane, Swecker & Mathis, L.L.P.

[57] ABSTRACT

Automatic repeat request (ARQ) functionality in a cellular mobile packet data communication system using a reservation slotted-ALOHA protocol is provided by assigning a temporary frame identity (TFI) to each data frame transmitted to or from a mobile station. The assigned TFI is unique among concurrent frame transfer sequences in a cell, and may be assigned based on information in a data frame sent to the mobile station or based on information in a channel reservation message that precedes the data frame sent to the mobile station. The TFI may also be assigned based on information in a channel reservation message that precedes a data frame sent from the mobile station, and the TFI assigned is unique among concurrent frame transfer sequences in a cell. The TFI is included in every block belonging to a particular frame, a block being the unit of data on which ARQ is based. A partial data frame to be retransmitted in case of a transmission error contains only the blocks determined by the ARQ protocol type (e.g., selective or Go-back-N) used, whereby a primary block need not be added to identify the mobile station. Blocks belonging to frames destined for different mobile stations can be multiplexed on the downlink based on the TFI. The mobile station may include, in its random access request, an indication that a TFI is already assigned.

18 Claims, 6 Drawing Sheets

| 1 | 2 | 3 | 4 | 5 | 6 | 7 | 8 | OCTET |
|---|---|---|---|---|---|---|---|---|
| TFI | | | | | | | | 1 |
| BLOCK SEQ NUM | | | | | TYPE | | P/F | 2 |
| NUM OF TRIES | | | | FOR FURTHER USE | | | | 3 |

OTHER PUBLICATIONS

J. Hämäläinen et al., "Packet Data over GSM Network", Tech. Doc. SMG 1 238/93, ETSI Sep. 28, 1993.

GSM 04.08, Version 4.9.0, Jul. 1994, pp. 72 and 401.

F. Halsall, "Data Communications, Computer Networks and OSI", Addison–Wesley Publishing Co., 1989, Protocol Basics, pp. 143–193.

"Proposals for the ARQ-Protocol in GPRS", Doc. No. ERV/S/3626/94, ERITEL, Sep. 1, 1994.

Fig. 2
*PRIOR ART*

| 1 | 2 | 3 | 4 | 5 | 6 | 7 | 8 | OCTET |
|---|---|---|---|---|---|---|---|---|
| MS IDENTITY | | | | | | | | 1 |
| | | | | | | | | 2 |
| | | | | | | | | 3 |
| | | | | | | | | 4 |
| FRAME LENGTH | | | | | | | | 5 |
| | | FRAME TYPE | | | | M/S | SEQ NUM | 6 |

Fig. 3A

| 1 | 2 | 3 | 4 | 5 | 6 | 7 | 8 | OCTET |
|---|---|---|---|---|---|---|---|---|
| TFI | | | | | | | | 1 |
| BLOCK SEQ NUM | | | | | TYPE | | P/F | 2 |
| NUM OF TRIES | | | | FOR FURTHER USE | | | | 3 |

Fig. 3B

| 1 | 2 | 3 | 4 | 5 | 6 | 7 | 8 | OCTET |
|---|---|---|---|---|---|---|---|---|
| TFI | | | | | | | | 1 |
| BLOCK SEQ NUM | | | | | TYPE | | P/F | 2 |

Fig. 5

| 1 | 2 | 3 | 4 | 5 | 6 | 7 | 8 | OCTET |
|---|---|---|---|---|---|---|---|---|
| RANDOM NUMBER | | | | | RETR | SING | PRIO | 1 |

Fig. 6

| 1 | 2 | 3 | 4 | 5 | 6 | 7 | 8 | OCTET |
|---|---|---|---|---|---|---|---|---|
| ERROR BIT MAP | | | | | | | ACK | 1 |

Fig. 4A, 4B, 4C, 4D, 4E

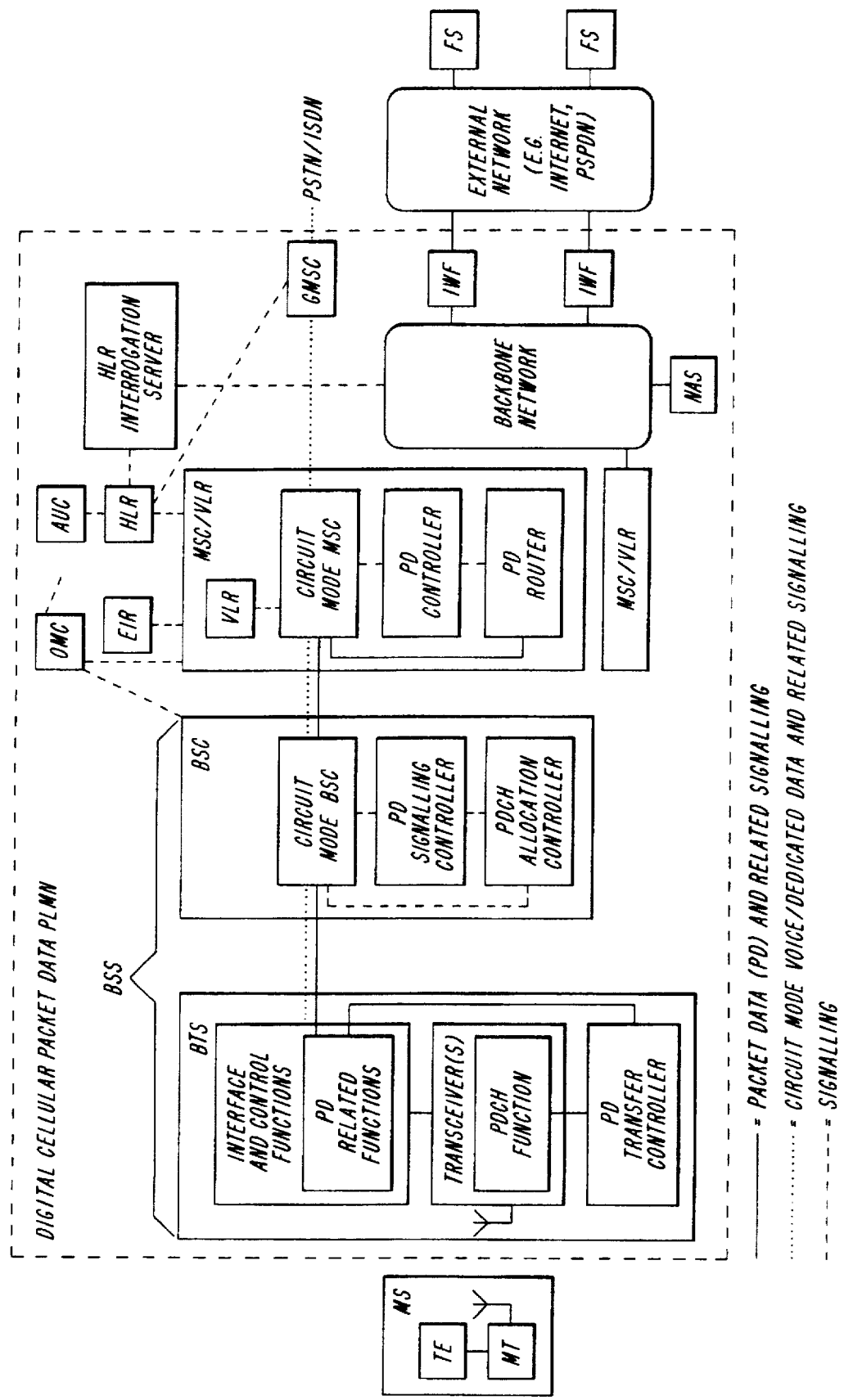

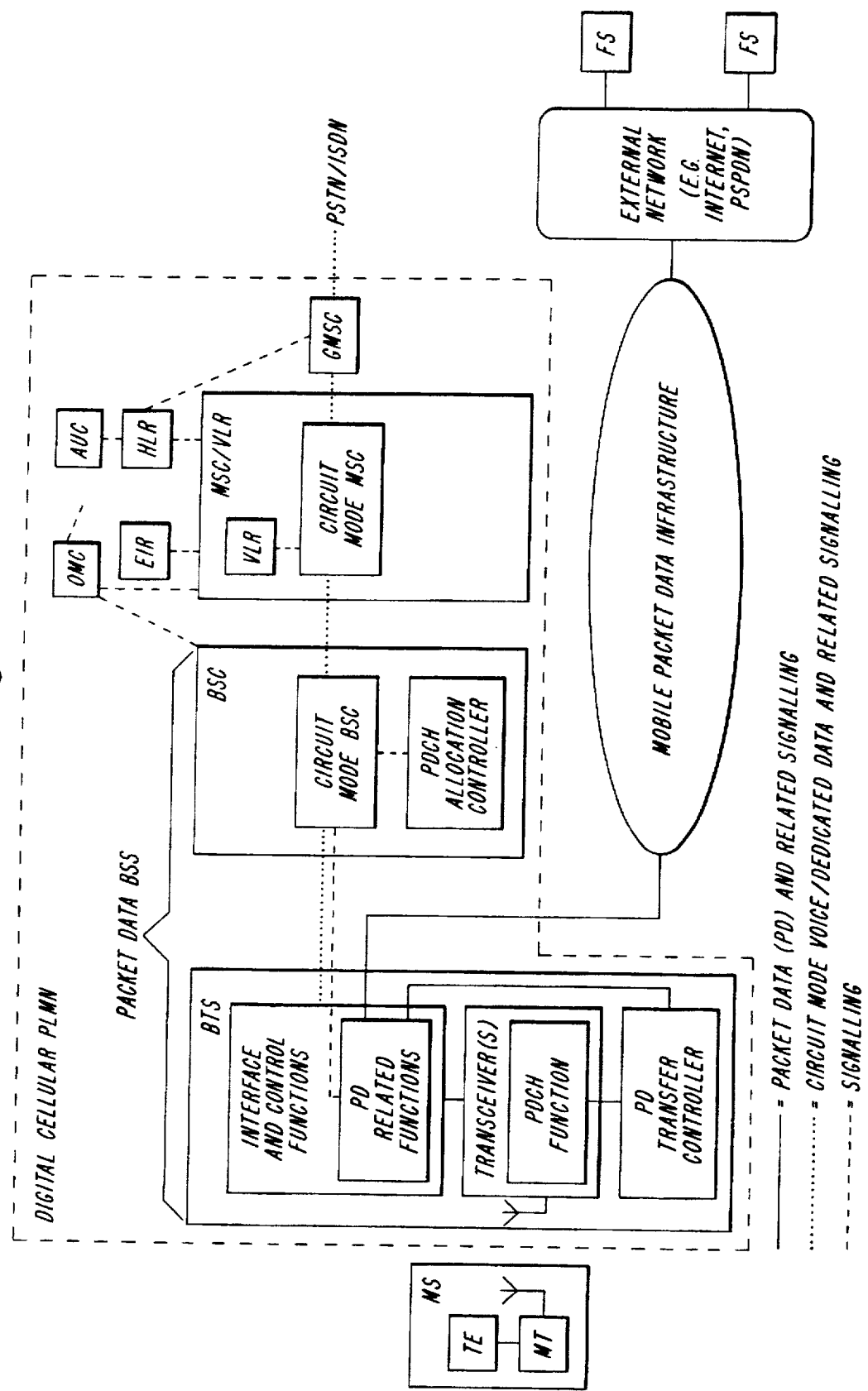

TEMPORARY FRAME IDENTIFICATION FOR ARQ IN A RESERVATION-SLOTTED-ALOHA TYPE OF PROTOCOL

BACKGROUND

Applicant's invention relates to mobile packet radio systems that use a reservation-slotted-ALOHA type of protocol, and more particularly to automatic repeat request (ARQ) in such systems.

In a mobile packet radio communication system, a base station (BS) communicates with a number of mobile stations (MSs) via one or more shared packet radio channels. Such mobile packet radio systems are described in U.S. Pat. No. 4,887,265 to Felix and in K. Felix, "Packet Switching in Digital Cellular Systems", *Proc. 38th IEEE Vehicular Technology Conf.* pp. 414–418 (June 1988). Similar systems are described in U.S. Pat. No. 4,916,691 to Goodman and in "Cellular Digital Packet Data (CDPD) System Specification", Vol. 1, "System Overview", Release 1.0 (Jul. 19, 1993). Packet data communication in the European Global System for Mobile Telecommunication (GSM) is described in P. Decker, "Packet Radio in GSM", Tech. Doc. SMG 4 58/93, European Telecommunications Standards Institute (ETSI) (Feb. 12, 1993); in P. Decker et al., "A General Packet Radio Service Proposed for GSM", Aachen University of Technology (Oct. 13, 1993); in J. Hamalainen et al., "Packet Data over GSM Network", Tech. Doc. SMG 1 238/93, ETSI (Sep. 28, 1993); and in European Patent Publication No. 0 544 464 to Beeson et al.

Downlink (BS to MS) traffic is scheduled by the BS to avoid contention, but to get access to the BS, MSs use random multiple access that inevitably leads to contention for uplink (MS to BS) traffic. Also for both directions, it is necessary that each data packet include an identification that uniquely designates the MS communicating with the BS (i.e., identifying the MS either as the recipient or as the sender of the data packet). It is desirable that such identifications facilitate implementation of an efficient radio protocol producing little overhead and being robust in various error situations.

The mobile packet radio communication system may have a single communication channel optimized for packet data, which is to say that both packet transfer and associated control signalling are conveyed across the same channel. On the other hand, the radio communication system may instead be a trunked multichannel system.

A trunked multi-channel mobile packet radio communication system is described in U.S. patent application Ser. No. 08/354,874 filed Dec. 9, 1994, now Pat. No. 5,590,133, by L. Billström et al. for "Apparatuses and Mobile Stations for Providing Packet Data Communication in Digital TDMA Cellular Systems" and in corresponding Swedish Patent Application No. 9304119-2 filed Dec. 10, 1993, both of which are incorporated here by reference. A trunked multi-channel mobile packet radio communication system is also described in "Tentative GPRS System Concepts", Tech. Doc. SMG GPRS 17/94, ETSI (May 1994). The abbreviation "GPRS" stands for "General Packet Radio Service".

In current cellular radio communication systems, radio channels are implemented by frequency modulating radio carrier signals, which in many systems have frequencies near 800 megahertz (MHz). In a TDMA cellular radiotelephone system, each radio channel is divided into a series of time slots, each of which contains a burst of information from a data source, e.g., a digital computer. During each time slot in a GSM-type system for example, 114 bits are transmitted, of which the major portion is information to be transmitted, including bits due to error correction coding, and the remaining portion is used for guard times and overhead signalling for purposes such as synchronization. Other systems transmit other numbers of bits during each slot (for example, 324 bits per slot in a system according to the digital advanced mobile phone service (D-AMPS) used in North America), and this should not be considered as limiting Applicant's invention.

The time slots are grouped into successive TDMA frames having a predetermined duration. In a GSM-type system for example, a frame comprises eight time slots. The number of different users that can simultaneously share the radio channel is related to the number of time slots in each TDMA frame. In general, the maximum number of users is the number of slots in each frame, but it is possible that one user may be assigned more than one slot in each frame. The successive time slots assigned to the same user, which may or may not be consecutive time slots on the radio carrier, can be considered a logical channel assigned to the user.

For a better understanding of the structure and operation of Applicant's invention, a communication system may be considered as having at least three layers. Layer 1 (L1) is the physical layer, which defines the parameters of the physical communication channel, e.g., radio frequency spacing, carrier modulation characteristics, etc. Layer 2 (L2) defines the techniques necessary for the accurate transmission of information within the constraints of the physical channel (L1), e.g., error correction and detection, etc. Layer 3 (L3) defines the procedures for transparent transfer of information over the L2 data link layer.

Since each TDMA time slot has a certain fixed information carrying capacity, each burst typically carries only a portion of an L3 message. In the uplink direction, multiple mobile stations attempt to gain access to the channel resources on a contention basis, while multiple mobile stations listen for L3 messages sent from the system in the downlink direction. In known systems, any given L3 message must be carried using as many TDMA channel bursts as required to send the entire L3 message.

Referring to FIG. 1, a data packet that is to be transmitted over a GSM-type air-interface typically comprises a user data portion and a layer-3 header portion L3H. The packet is formatted, normally after encryption, into a frame comprising an information field and a frame header FH. The frame is then segmented into as many blocks as are needed. Each block comprises a block header BH, an information field, and a BCS field, and each block is transmitted as four bursts in consecutive TDMA frames.

As illustrated in FIG. 2, an exemplary frame header FH might comprise fortyeight bits that carry the following information: the identity of the MS (thirty-two bits, or four octets), the length of the frame in octets (ten bits, or one octet plus two bits), the type of the frame (three bits), a mobile/stationary flag (one bit), and a frame sequence number (two bits). It is possible to extend a frame header FH by setting the frame-type bits to predetermined values, e.g., 111. It will be appreciated that FIG. 2 shows only one possible example and that a great variety of other examples are possible.

Control messages such as channel reservation messages and acknowledgment messages occupy two time slots, while random access requests and reserved access acknowledgments are one-slot messages. These messages are discussed in more detail below.

It will be noted that every frame transferred across the air-interface includes a unique identification number of a MS, typically in the frame header (see FIG. 1). In "ordinary" GSM, the unique global identification number of a MS is the International Mobile Subscriber Identity (IMSI). Some systems apply an identity-confidentiality service for IMSIs, in which case a Temporary Mobile Subscriber Identity (TMSI) that has significance only within a particular LA is used. Outside the LA, a TMSI is combined with a Location Area Identifier to maintain unambiguous identification. See "European Digital Cellular Telecommunications Systems (Phase 2); Mobile Radio Interface Layer 3 Specification", GSM 04.08, Version 4.9.0, Section 4.3.1, ETSI TC-SMG (Jul. 1994). Although another type of complete identity of a MS might be used in the frame header (e.g., a CDPD identity comparable to the TMSI), in this example it is assumed to be the TMSI.

Because the TMSI can be up to four octets in length and the frame itself is fragmented into blocks, much overhead is created if every block must include the TMSI, i.e., carry the same amount of addressing information. This is also true for blocks that are retransmitted after errors. Therefore, only the first block in the complete or partial data frame usually carries the complete identification of a MS. Thus in the case of retransmission, an additional primary block may have to be added to the partial data frame to be retransmitted, in order to accommodate the MS's complete identification. This itself is an increase in overhead that is undesirable.

SUMMARY

In accordance with one aspect of Applicant's invention, a method of implementing ARQ in a mobile packet data communications system using a reservation slotted-ALOHA protocol comprises the step of assigning a temporary frame identity (TFI) to each data frame transmitted to a mobile station. The assigned TFI is unique among concurrent frame transfer sequences in a cell, and may be assigned based on information in a data frame sent to the mobile station or based on information in a channel reservation message that precedes the data frame sent to the mobile station.

In another aspect of Applicant's invention, a method of implementing ARQ in a mobile packet data communications system using a reservation slotted-ALOHA protocol comprises the step of assigning a TFI to each data frame transmitted from a mobile station. The TFI is assigned based on information in a channel reservation message that precedes a data frame sent from the mobile station, and the TFI assigned is unique among concurrent frame transfer sequences in a cell.

The TFI is included in every block belonging to a particular frame, a block being the unit of data on which ARQ is based. A partial data frame to be retransmitted in case of a transmission error contains only the blocks determined by the ARQ protocol type (e.g., selective, and Go-back-N) used, whereby a primary block need not be added to identify the mobile station. Blocks belonging to frames destined for different mobile entities can be multiplexed on the downlink based on the TFI. The mobile station may include, in its random access request, an indication that a TFI is already assigned.

With Applicant's invention, the first block of a data frame transmission may be erroneous and still the remaining blocks can be correctly received and correctly associated with a particular frame and a particular mobile station. In case of an uncompleted frame transfer caused by an erroneous acknowledgment message from the mobile station, communication can be resumed if the base station sends a message with the TFI of the frame whose transfer was disrupted (e.g., by retransmitting the first block of the last transmission). In case of an uncompleted frame transfer caused by an erroneous acknowledgment message from the base station, communication can be resumed if the mobile station sends a random access request and, after receiving a channel reservation, the TFI of the frame whose transfer was disrupted (e.g., by retransmitting the first block of the last transmission).

BRIEF DESCRIPTION OF THE DRAWINGS

Applicant's invention is described below in more detail with reference to embodiments that are given only by way of example and that are illustrated in the accompanying drawings, in which:

FIG. 2 illustrates the structure of a frame header;

FIGS. 3A, 3B illustrate structures of block headers;

FIGS. 4A, 4B show message sequences across the air-interface for mobile-originated (MO) packet transfers;

FIGS. 4C, 4D, 4E show message sequences across the air-interface for mobile-terminated (MT) packet transfers;

FIG. 5 shows the structure of a random access request message;

FIG. 6 shows the structure of a short acknowledgement message;

FIG. 7 illustrates a GSM-type communication system having packet data functions;

FIG. 9 illustrates another GSM-type communication system having packet data functions.

DETAILED DESCRIPTION

Figure 1:
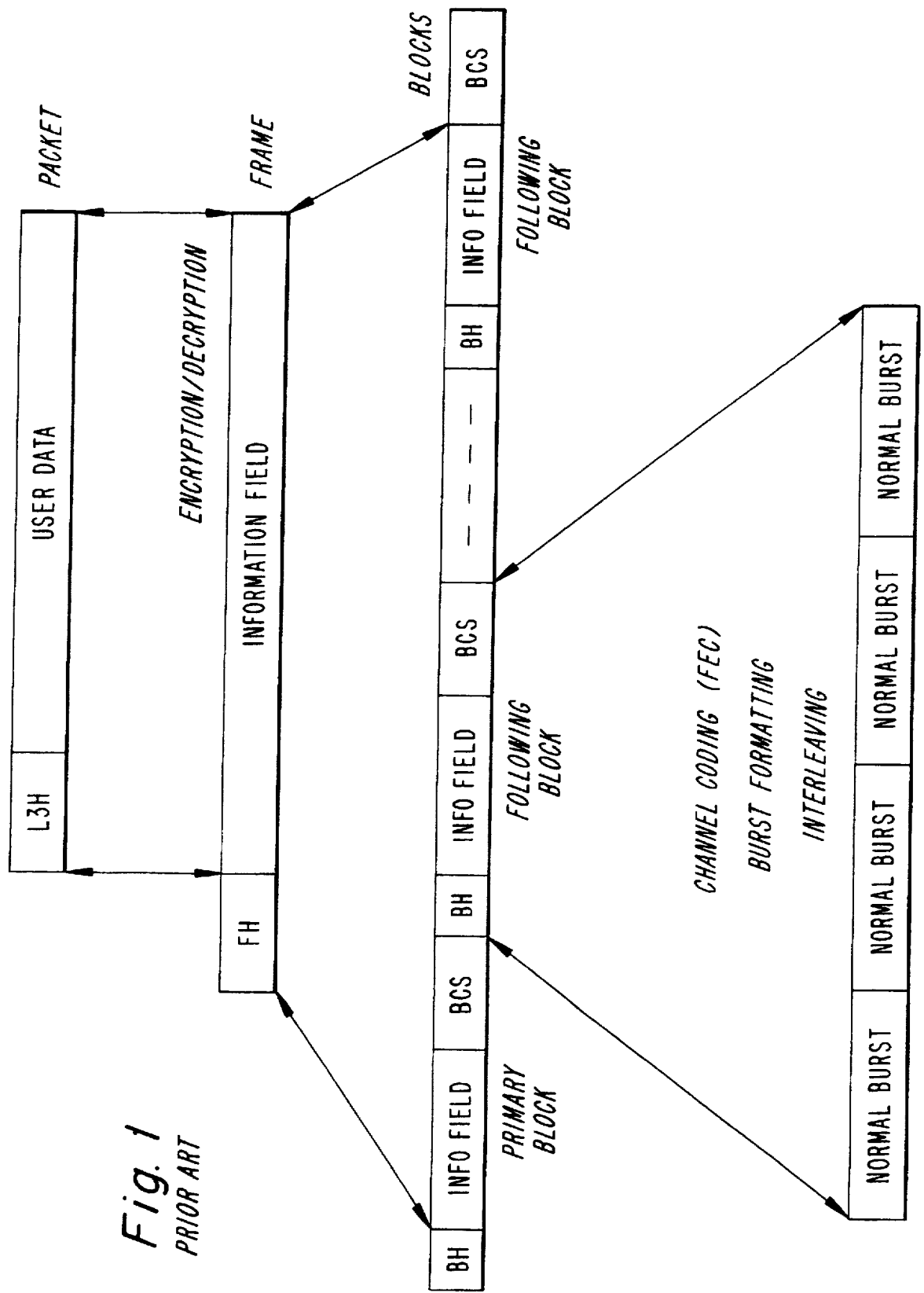
FIG. 1 illustrates the block and frame structure of data packets.

The TDMA structure and the need to allow for some degree of timing misalignment at first random access led to Applicant's selection of a reservation-slotted-ALOHA type of protocol for use in a GSM-type packet communication system as described in this application. Nevertheless, it will be understood that Applicant's invention can be embodied in other system platforms as well.

In accordance with Applicant's invention, a unique temporary frame identity (TFI) is assigned to each frame to be transferred. The TFI is of local character in the particular cell in which the transfer is to take place. In other words, the particular TFI assigned to a frame is dependent on the cell in which the transfer is to take place and is different from other TFIs used in concurrent packet transfers in that cell. Every block in a frame includes the same TFI, viz., the TFI uniquely assigned to the blocks' particular frame, and blocks that must be retransmitted include their original TFIs. It will be appreciated that the TFI substantially replaces the combination of the TMSI and the frame sequence number FN that is ordinarily included in blocks to be transferred.

Also in accordance with Applicant's invention, each block contains a respective block sequence number for indicating the relative position of the block in the frame. Applicant's combination of the block sequence number and the TFI unambiguously identifies an individual block as a specific block within a particular frame. In this way, Applicant's invention provides an ARQ protocol without requiring inclusion of a primary block in each retransmitted frame. It will be appreciated that although this description focusses on selective ARQ, Applicant's invention may be applied to other types of ARQ protocol, e.g., "Go-back-N continuous" ARQ, which is described in the literature, including F. Halsall, *Data Communications, Computer Networks and OSI*, Addison-Wesley Publishing Co. (1989).

Thus, in accordance with Applicant's invention and as shown in FIGS. 3A, 3B, a block header typically comprises the TFI (eight bits), the block sequence number (five bits), a type of the block (two bits), and a poll/final bit. The block header of the primary block in a frame (FIG. 3A) advantageously further comprises a number of random access tries (e.g., four bits), with the remaining bits of the additional octet being available for other uses. In the example illustrated, the length of a block header BH in a primary block is twenty-four bits (three octets), and the length of a block header BH in a following block (FIG. 3B) is sixteen bits (two octets).

Assignment and release of TFI values are administrative services provided by the media access layer management on the network side. The minimum size of the TFI field is determined by the number of possible concurrent packet transfers in one cell. It is currently believed that eight bits is a good balance of instantaneous capacity against overhead, but other balances could be struck of course. The TFI values can be continually reused, thus distinguishing subsequent packet transfers from earlier ones.

For an MO packet transfer, the BS assigns the TFI as a part of the channel reservation procedure and sends the TFI to the MS in a channel reservation command ChRe. For an MT packet transfer, the BS sends both the mobile's TMSI and the TFI assigned to the particular frame in the primary block of the frame. The TMSI is sent as the part of the frame header FH, and the TFI is sent as the part of the block headers BH. In this way, the MS is informed of the TFI for the current frame transfer.

It is currently preferred that every block in a frame transmitted across the air-interface, whether on the uplink or the downlink, include the same TFI, which unambiguously identifies that particular frame. It is not strictly necessary for TFIs to be included in blocks transmitted in a scheduled uplink transfer, but their presence adds to the robustness of the protocol.

An exemplary radio link protocol using Applicant's invention is a selective-ARQ type of protocol. Selective ARQ means only erroneous blocks are retransmitted. Basic scenarios are presented in FIGS. 4A–4E that should be sufficient for those of ordinary skill in this art, and the following description is based on the patent applications cited above that have been incorporated here by reference.

In a GSM-type packet communication system using a reservation-slotted-ALOHA type of protocol, a MS initiates a packet transfer by transmitting a random access request Ra on a packet data channel (PDCH) uplink when allowed to do so. This so-called random access sub-channel is determined by uplink state flags (USFs) marked as "free" (indicated as USF=f in FIGS. 4A–4E) or "reserved" (indicated as USF=R in FIGS. 4A–4E) on the PDCH downlink. As seen in FIG. 5, the random access request Ra uses the same type of access burst as in ordinary GSM, and comprises a five-bit random number for providing an initial identification of the MS, and other information that is described below.

FIGS. 4A–4E illustrate message sequences across the air-interface for mobile-originated (MO) and mobile-terminated (MT) packet transfers. An index for time slots numbered 1 through 51 is shown across the top of FIG. 4A.

Figures 4A, 4B, 4C, 4D, 4E:
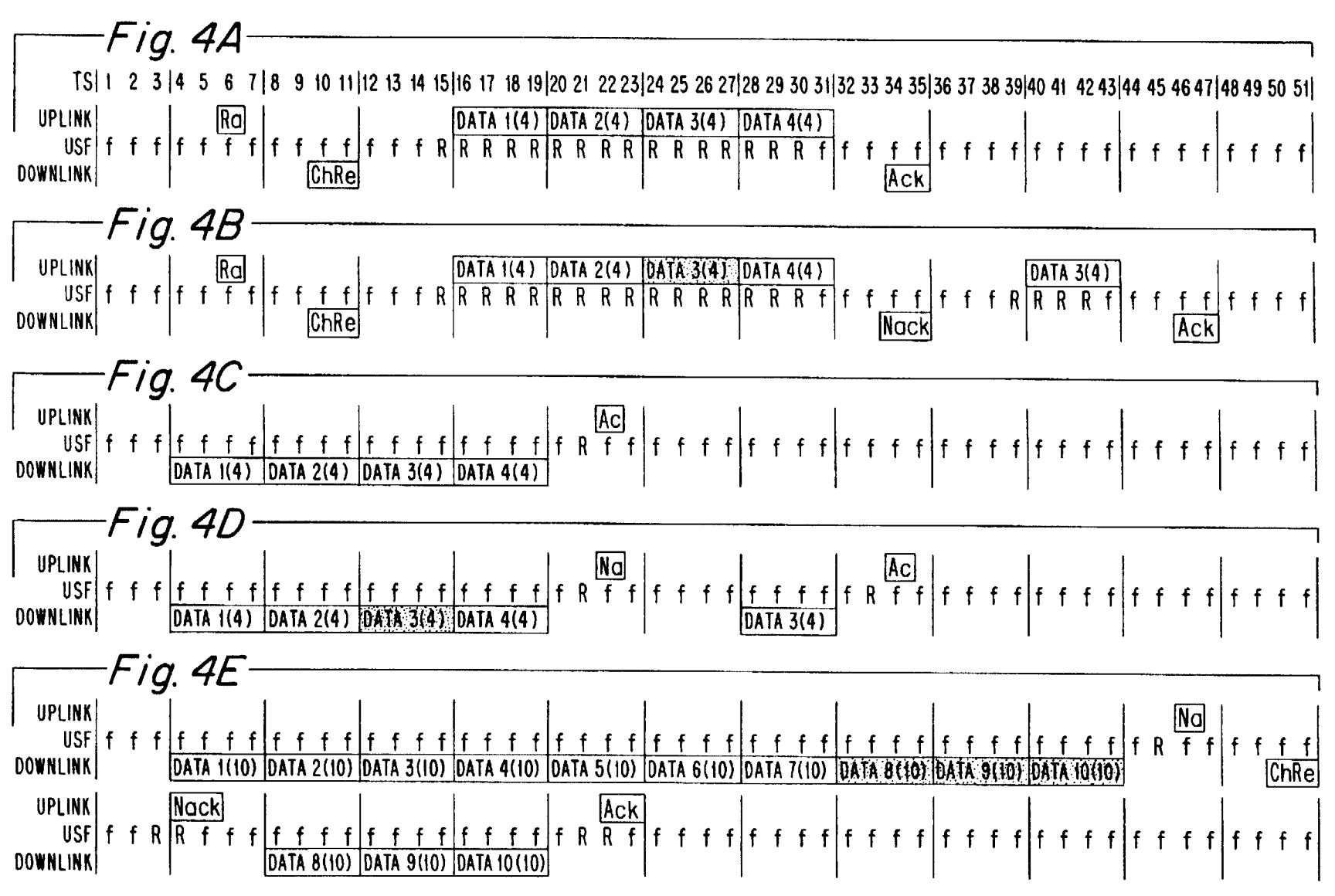

As illustrated in FIG. 4A, packet transfer in the MO direction starts with a mobile's transmitting a random access request Ra. The MS checks that the USF=f, and if it is, the MS transmits the random access request in the next time slot. If the USF=R, the MS typically would wait until the USF=f, randomly select one of a predetermined number of subsequent time slots, and transmit the random access request in the selected slot if the USF is still free.

The normal response from the system to such a random access request is a BS's transmitting a channel reservation command ChRe, reserving future slots (USF=R) for uplink transfer of a variable length data packet. The channel reservation command ChRe is sent on the PDCH downlink and usually includes a request reference and a timing advance. The purpose of the request reference information is to address the particular MS by providing the random access information used in the access request Ra and a frame number FN modulo 42432 for the TDMA frame in which the access request was received (see "European Digital Cellular Telecommunications Systems (Phase 2); Mobile Radio Interface Layer 3 Specification", GSM 04.08, Version 4.9.0, Section 10.5.2.30, ETSI TC-SMG (Jul. 1994)). If the system does not respond to the mobile's random access request Ra, the MS makes a retry after a random backoff time.

After the MS transmits a data frame in the reserved time slots, the BS transmits a positive acknowledgment message Ack if the whole data frame was correctly received. In the example illustrated in FIG. 4A, the data frame transmitted by the MS consists of four blocks, or sixteen bursts (time slots 16–31). If the data frame was received with an error, the BS transmits a two-burst negative acknowledgment message Nack, in response to which the MS retransmits only the erroneous blocks as a partial frame. This is illustrated by FIG. 4B: the third block of the frame (time slots 24–27) was received with an error, prompting transmission of a Nack message by the system in slots 34, 35, a retransmission of the third block by the MS in slots 40–43, and transmission of an Ack message by the system in slots 46, 47.

Referring to FIGS. 4C–4E, packet transfer in the MT direction starts with a paging message transmitted by the system on the PDCH downlink. To economize on radio spectrum, paging is limited to the smallest possible group of cells based on location area (LA), the mobile's recent cell location history, and MS submode. A paging message may include reservation of an access slot on the PDCH uplink for the MS's response to the paging message. After receiving a paging response from the MS, the system sends a data frame to the MS. Under certain conditions, e.g., when the cell location of a MS is known with a high degree of probability, data sent in the MT direction is sent directly as "Immediate Data" without a preceding paging message. This situation is illustrated in FIGS. 4C–4E.

The MS replies to an "Immediate Data" transmission by sending an acknowledgement message in a reserved access slot. The acknowledgment message can be either a short (one burst) Ack message if all blocks were correctly received (see FIG. 4C) or a short (one burst) Nack message if all blocks were not correctly received (see FIGS. 4D, 4E). As illustrated in FIG. 6, the short Nack message includes a bitmap indicating the erroneous blocks, at least for smaller packets (e.g., up to seven blocks), and an acknowledgment flag (ACK in FIG. 6). If the acknowledgement flag is set to a predetermined value, e.g., 1, then all blocks have been received without errors. If a bit in the bitmap is set to a predetermined value, e.g., 1, an error in the corresponding block is indicated. In the situation illustrated in FIG. 4D, the frame consisted of four blocks, the third of which was incorrectly received; the ACK flag in the short Nack message sent by the MS was then set to 0 and with the bitmap caused the system to retransmit the third block.

For larger packets (i.e., more than seven blocks), the short Nack message indicates to the system that a channel reservation is needed for a longer (two burst), complete negative acknowledgment message Nack. This can be indicated by setting the values of all bits in the bitmap to the value indicating no errors, e.g. 0, and at the same time setting the value of the ACK flag bit to 0, indicating errors. In FIG. 4E, blocks 8, 9, and 10 were incorrectly received, and the system responded to the mobile's short Nack message (all zeroes) with the reservation message ChRe indicating reserved time slots for a long (two-burst) Nack that includes a complete bitmap for all blocks in the frame.

The structure of the two-burst acknowledgement message comprises the TFI, the Ack/Nack indicator, and a list (bitmap) of erroneously received blocks. On the downlink, the two-burst acknowledgement message also includes a channel reservation for retransmission. The MS transmitted the long (two-burst) Nack message in the assigned slots, and that message indicated to the system that retransmission of blocks 8, 9, and 10 was needed. For either short or long negative acknowledgement messages, partial frames that consist of not-acknowledged blocks are sent by the system until a positive acknowledgment message is received from the MS.

Thus in accordance with Applicant's invention, each transmission of a complete or partial frame is followed by an acknowledgment message that includes the TFI of the frame to which it refers and, if needed, a list of the blocks that were erroneous. Since a one-burst Ack/Nack message is sent only in a reserved slot, the sending mobile station is indirectly identified and does not need to include the TFI in the one-burst Ack/Nack message. Partial frames that consist of retransmitted not-acknowledged blocks are sent until a positive acknowledgment is received, viz., until reception of an acknowledgement message that does not include a list of erroneous blocks.

A TFI remains valid even if the communication is disrupted for some short period of time. For example, when an erroneous acknowledgment message is sent by the BS, the MS can reestablish the communication by sending a random access request message Ra that notifies the BS that a TFI is already assigned. As illustrated in FIG. 5, the random access request message Ra advantageously comprises a single octet in which some bits (e.g., five) convey the pseudo-random number identifying the MS, one bit (RETR in FIG. 5) indicates an initial/retransmission request, one bit (SING in FIG. 5) indicates whether the MS intends to transmit only a single block on the uplink, and another bit (PRIO in FIG. 5) indicates a priority. The pseudorandom number is used to distinguish access requests from different mobiles. The initial/retransmission request indicates that a TFI is already assigned.

Upon receiving the channel reservation message ChRe sent by the BS in response to the random access message Ra, the MS can identify and resume the uncompleted frame transfer by restating its TFI (e.g., by retransmitting the primary block of the incomplete transfer), and the BS can then continue the frame transfer by sending the same acknowledgment message that was erroneous in the previous transmission. Operation in this way has significant advantages. When reestablishing communication with a BS in case of an uncompleted packet transfer (e.g., a missing acknowledgment message from the BS), it is sufficient to state the TFI of the frame whose transfer was interrupted (e.g., by retransmitting the first block of the last transmission).

After a frame is successfully transferred across the air-interface, viz., after a positive acknowledgment has been received, the network-side layer management entity can release the TFI value and make it available for future use. Release of the TFI value can also occur in the case of persistent loss of response from an MS or when a MS roams to another cell.

It should be appreciated that Applicant's invention provides a communication system having many advantages over other systems. The TFI is a short identity that replaces the combination of the TMSI and frame sequence number FN during frame transfers across the air-interface. Also, the combination of the TFI and the block sequence number unambiguously identifies a block in a particular frame sent to/from a particular MS. Moreover by using a TFI as a part of every block's header, there is no need for the additional primary block that is necessary for each retransmitted partial data frame in order to accommodate the complete identification of the MS. Furthermore by including a TFI in every block of a frame, the first block of the frame can be incorrectly received and still the remaining blocks can be correctly received and correctly associated with a particular frame and a particular MS.

As a result of Applicant's invention, the scheduling of downlink traffic is made simpler, more flexible, and more spectrum efficient for the following reasons: (1) blocks belonging to frames destined for different MSs can be multiplexed on the same downlink channel (e.g., while waiting for an acknowledgment message from a first MS, a few blocks can be sent to a second MS, thereby fully utilizing the downlink spectrum); (2) the downlink transmission of a data frame comprising a plurality of blocks can be interrupted, for example by a control message to some other MS, and then resumed; and (3) if more than one data channel is available for the downlink traffic, blocks belonging to the same frame can be transmitted on different channels and the intended MS can still properly receive them, provided the MS is capable of monitoring multiple channels in parallel.

As described above, Applicant's invention may be applied in a digital TDMA cellular radiotelephone system having a GSM-type architecture. In one such system that is described first below, packet data services are added to a GSM-type system in a closely integrated way, using current GSM infrastructure to the maximum extent possible. The second such system described below uses primarily the BS portion of a GSM network and adds a separate mobile packet data infrastructure for the other network parts.

FIG. 7 illustrates a GSM system enhanced with packet data (PD) functions, the major PD function blocks being indicated by bold contour lines. A plurality of base transceiver stations (BTSs), each providing radio communication service to multiple MSs in a respective cell, together provide complete coverage of the GSM public land mobile network (PLMN) service area. Only one BTS and one MS, which comprises a mobile termination (MT) part and a terminal equipment (TE) part, are shown schematically in FIG. 7. The functional units of the BTS carry out the above-described steps of assigning, to each data frame transmitted to an MS, a TFI that is unique among other TFIs assigned to data frames concurrently transmitted to other mobile stations.

A group of BTSs is controlled by a base station controller (BSC), and these together form a base station system (BSS). In the preceding description, a BS may be considered as a combination of a BTS and its BSC. One or more BSSs are served by a mobile services switching center (MSC) and an associated visitor location register (VLR). The MSC controls calls to and from other networks, such as the public switched telephone network (PSTN), an integrated services digital network (ISDN), and other PLMNs. An MSC equipped for routing incoming calls is referred to as a gateway MSC (GMSC). One or more MSC service areas together constitute the PLMN service area.

The MSC/VLR(s) communicate with a home location register (HLR) via a common channel signalling (CCS) system No. 7 network, which is standardized by the International Telegraph & Telephone Consultative Committee (CCITT), now the International Telecommunications Union (ITU). The HLR is a data base comprising information on all subscribers, including location information identifying the MSC/VLR where a subscriber is currently (or was last) registered. Connected to the HLR is an authentication center (AUC) that provides the HLR with authentication parameters. To allow identification of subscriber equipment, an equipment identity register (EIR) is also connected to the MSC(s). Finally, an operations and maintenance center (OMC) may be included for providing overall network support.

The packet data functionality in the BTS includes capability to provide one or more shared PDCHs, depending on demand. In a cell only occasionally visited by a packet data user, a PDCH may be allocated temporarily on user demand. In a cell having continuous packet data traffic demand, one or more PDCHs may be allocated either semi-permanently or dynamically, adapted to the current load situation. The allocation of PDCHs is controlled from the BSC. Information defining the support level and any PDCH allocated for initiating packet transfer is broadcast on a conventional GSM broadcast control channel (BCCH).

The packet data radio link protocol over the PDCH(s) allocated in a cell is handled by a PD transfer controller in the BTS. In a BTS having at least one PDCH allocated, the PD transfer controller has a physical connection for packet transfer to and from the MSC. The physical connection is typically unique and uses ordinary internode trunks.

The MSC/VLR includes a PD router for routing packets to and from the MSC service area and a PD signalling controller for handling signalling exchange with a circuit mode MSC. The PD signalling controller also handles control, monitoring, and parameter storage functions related to packet data MSs. The PD controller comprises a processor, memory, signalling interface functions, and software. Although the PD router and PD signalling controller are shown as parts of the MSC/VLR, it will be understood that either or both, in whole or in part, could be physically realized as external equipment attached to the MSC.

MSCs (PD routers) are interconnected via a backbone network, to which one or more interworking functions (IWFS) are also connected. IWFs enable internetworking with external network(s), such as the Internet (i.e., IP network) and/or a packet switched public data network (PSPDN) (i.e., an X.25 network), thus interconnecting fixed stations (FSs) with the MSs. An IWF may perform protocol conversion and address translation, as required, and an IWF may also route packet data traffic between cooperating PLMNs. Packet data traffic between MSs in different MSC service areas in the same PLMN is normally routed directly between the respective MSCs, across the backbone network. For routing purposes, the HLR may be interrogated from entities on the backbone network through an HLR interrogation server, which provides the functions necessary for such interrogation from the packet data network. The AUC, EIR, OMC, and HLR interrogation server may also be enhanced from time to time to support new types of subscriptions, services, and equipment.

The basic packet data network service provided by a cellular packet data PLMN such as that illustrated in FIG. 7 is a standard connectionless network (datagram) service based on a standard connectionless IP protocol. The term "IP protocol" should be understood to denote either the Internet Protocol (the de facto standard IP protocol used in the TCP/IP protocol suite) or the International Standards Organization (ISO) Internetwork protocol ISO 8473. Value-added services, including multicast, broadcast, and electronic mail services, may be provided by Network Application Server(s) (NAS(s)), attached to the backbone network and accessed by using higher layer protocols on top of the IP. Thus, from a packet data communication point of view, the PLMN basically appears as an IP network.

Figure 8:
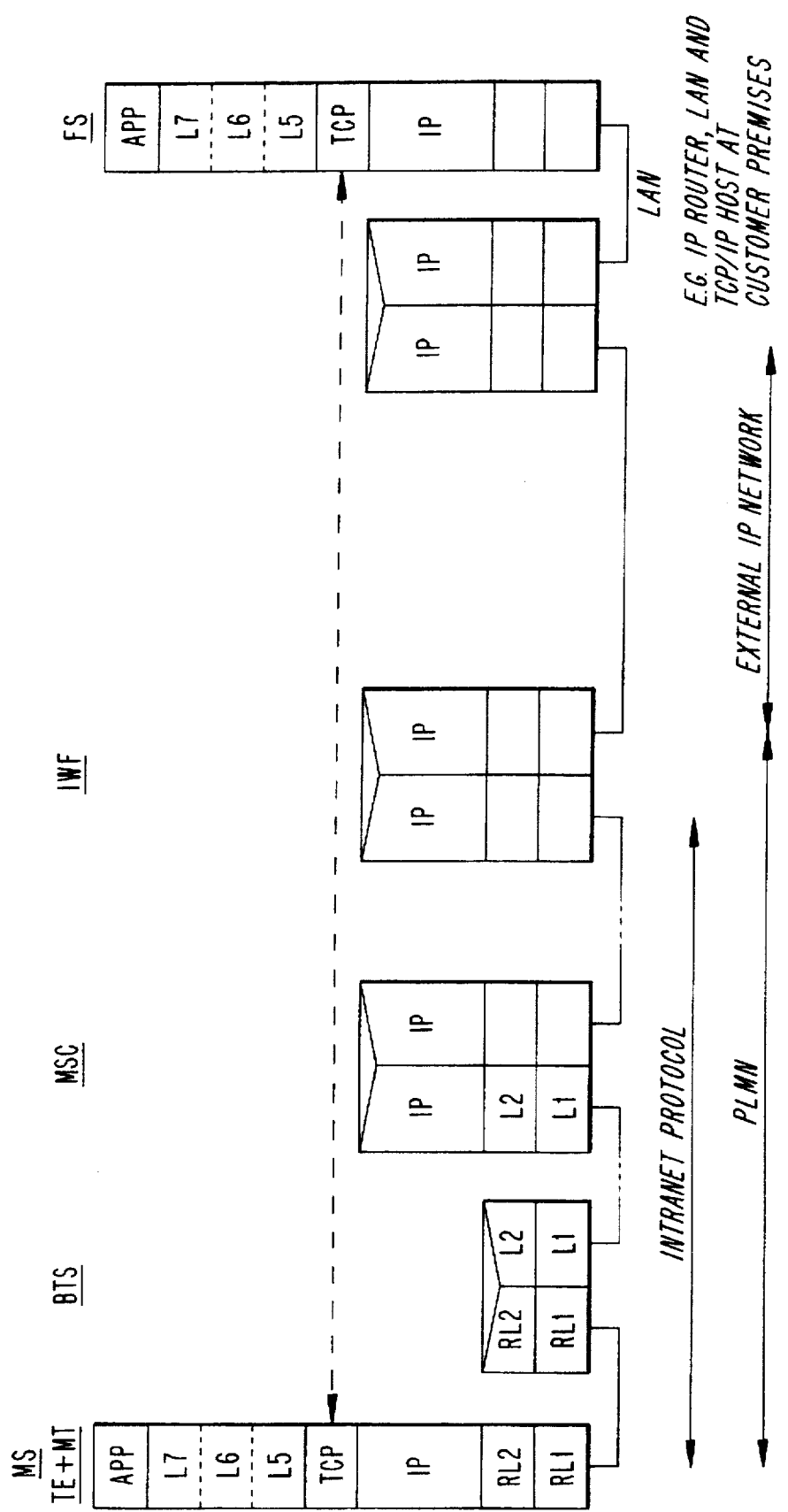
FIG. 8 illustrates the protocol architecture of the system of FIG. 7.

The protocol architecture is illustrated by FIG. 8, which shows an example of communication between an MS and an FS, e.g., a host computer, attached to an external IP network. Thus, the IWF and MSC both play the role of IP (layer 3) routers, and the MS and FS can communicate end-to-end using a transmission control protocol (TCP), or transport (layer 4) protocol. For the architecture illustrated in FIG. 8, the MT and TE parts of the MS would be integrated in one unit.

Between the MSC and the MS, the BTS acts as a link layer (layer 2) relay between the radio link protocol (denoted RL2 in FIG. 8) and the link protocol (denoted L2) used across the trunk connection. The radio protocol handled by the BTS is Applicant's ARQ type of protocol described above. In contrast to ordinary GSM, encryption/decryption is performed between the MT part of the MS and the MSC. An MS is identified on layer 3 with an IP address and on layer 2 with standard GSM identities: the IMSI, or more typically, the TMSI.

Another GSM-type system that can benefit from Applicant's invention is schematically illustrated in FIG. 9, in which the major PD function blocks are indicated by bold outlines. In FIG. 9, only the BSS portion of the GSM infrastructure is utilized for packet data. The PD functions in the BTS are almost the same as in the system illustrated in FIG. 7, as are the PDCH-allocation functions in the BSC. Again, the functional units of the BTS carry out the above-described steps of assigning, to each data frame transmitted to an MS, a TFI that is unique among other TFIs assigned to data frames concurrently transmitted to other mobile stations.

As illustrated in FIG. 9, the packet data transfer connection of a BTS is coupled to a separate Mobile Packet Data Infrastructure (MPDI) instead of a PD router in the MSC/VLR. The MPDI provides the necessary packet routing, mobility management, authentication, and network management functions. Together, the MPDI and the portions of BSS(s) utilized for packet data constitute a mobile packet data system. With respect to GSM, the system may be regarded as a separate system, and a GSM operator may choose to lease radio channel capacity to a separate packet data system operator. An MS requiring both packet data and regular GSM services may then need a separate subscription in each system. The packet data services provided by the system may (depending on the functionality of the MPDI) be the same as those provided by the system illustrated in FIG. 7.

In the system shown in FIG. 9, the only radio channels available for MSs are PDCHs and regular GSM broadcast channels. Thus, registration, location updating (or cell location reporting), authentication, and similar signalling are performed via PDCHs, and thus allocation of a first master packet data channel (MPDCH) on user demand, using ordinary GSM signalling as in FIG. 7, is not possible. With this exception, the functions for providing PDCHs are the same as described for FIG. 7.

The MPDCH is the first PDCH allocated in a cell on which packet transfers are initiated and is normally allocated by system configuration, although the method of using a PDCH of an adjacent cell for requesting allocation of an MPDCH in a "PDCH on demand" cell, prior to moving into that cell, is also feasible. In that case, the allocation request would be transferred to a system entity in the MPDI. This system entity would then send an allocation request to the BTS of the "PDCH on demand" cell in question, and that cell would, in turn, convey the request to the PDCH allocation controller in the BSC.

Regular GSM broadcast control channels are used in the same way as in the system illustrated in FIG. 7 for defining PDCH support level and MPDCH allocated in the cell (via information on BCCH) and for performing cell selection with two alternative criteria for cell selection. Listening to cell broadcast short messages is also possible in a way similar to that of the system in FIG. 7.

Packet transfer across PDCHs may be performed according to the principles described for FIG. 7. The PD transfer controller and associated interface functions in the BTS are also adapted to the interconnection requirements of the MPDI, e.g., to allow interconnection via a routing network. The functions of the MS in the system of FIG. 9 are basically the same as the MS functions in the system of FIG. 7, except for functions related to regular GSM signalling and PD mode, which are not applicable in the system of FIG. 9.

While specific embodiments of the present invention applied to a GSM type of cellular system have been described, it should be understood that the present invention may be applied also to other TDMA cellular systems including D-AMPS and PDC systems. Although in these systems, BSC is not provided as a separate functional entity, corresponding base station controller functions and associated new PD functions are instead divided between MSC and base stations.

It will be understood that Applicant's invention is not limited to the particular embodiments that have been described and illustrated. This application contemplates any and all modifications that fall within the spirit and scope of Applicant's invention as defined by the following claims.

What is claimed is:

1. In a mobile packet communications system using a reservation slotted-ALOHA protocol in which data frames are exchanged between a base station and mobile stations, a method of implementing automatic repeat request (ARQ), comprising the steps of assigning, to each data frame transmitted to a mobile station, a temporary frame identity (TFI); wherein the TFI assigned is unique among other TFIs assigned to data frames concurrently transmitted to other mobile stations; including the assigned TFI in every data block in the data frame to which the TFI is assigned; and resuming transmission of an uncompleted data frame, wherein transmission was interrupted, by the base station's transmitting a predetermined message that includes the TFI assigned to the uncompleted data frame.

2. The method of claim 1, wherein the TFI is assigned based on information in the data frame transmitted to the mobile station to which the TFI is assigned.

3. The method of claim 1, wherein the TFI is assigned based on information in a channel reservation message that precedes the data frame transmitted to the mobile station to which the TFI is assigned.

4. The method of claim 1, further comprising the step of including the TFI assigned in an acknowledgment message transmitted by the mobile station.

5. The method of claim 1, wherein the base station retransmits only those data blocks that have been received with transmission errors without changing contents of those data blocks.

6. The method of claim 5, wherein a first data block of the data frame is received with a transmission error and remaining data blocks of the data frame are correctly received and correctly associated with the data frame and the mobile station.

7. In a mobile packet communications system using a reservation slotted-ALOHA protocol in which data frames are exchanged between a base station and mobile stations, a method of implementing automatic repeat request (ARQ), comprising the steps of:
assigning, to each data frame transmitted to a mobile station, a temporary frame identity (TFI), wherein the TFI assigned is unique among other TFIs assigned to data frames concurrently transmitted to other mobile stations;
including the assigned TFI in every data block in the data frame to which the TFI is assigned, wherein each data frame comprises a plurality of data blocks; and
resuming transmission of an uncompleted data frame, wherein transmission was interrupted by an acknowledgment message erroneously transmitted by the mobile station, by the base station's transmitting a predetermined message that includes the TFI assigned to the uncompleted data frame.

8. The method of claim 7, wherein the predetermined message is a first data block of the uncompleted data frame.

9. The method of claim 5, wherein data blocks in data frames transmitted to different mobile stations are multiplexed on a downlink communication channel based on TFIs assigned to the respective dataframes.

10. In a mobile packet communications system using a reservation slotted-ALOHA protocol in which data frames are exchanged between a base station and mobile stations, a method of implementing automatic repeat request (ARQ), comprising the steps of assigning, to each data frame transmitted by a mobile station, a temporary frame identity (TFI); wherein the TFI is assigned based on information in a channel reservation message that precedes a data frame transmitted by the mobile station, the TFI assigned is unique among other TFIs assigned to data frames concurrently transmitted by other mobile stations; including the assigned TFI in every data block in the data frame to which the TFI is assigned; and resuming transmission of an uncompleted data frame, wherein transmission was interrupted, by the base station's transmitting a predetermined message that includes the TFI assigned to the uncompleted data frame.

11. The method of claim 10, further comprising the step of including the TFI assigned in an acknowledgment message transmitted by the mobile station.

12. The method of claim 10, wherein the mobile station retransmits only those data blocks that have been received with transmission errors without changing contents of those data blocks.

13. The method of claim 12, wherein a first data block of the data frame is received with a transmission error and remaining data blocks of the data frame are correctly received and correctly associated with the data frame and the mobile station.

14. In a mobile packet communications system using a reservation slotted-ALOHA protocol in which data frames are exchanged between a base station and mobile stations, a method of implementing automatic repeat request (ARQ), comprising the steps of:

assigning, to each data frame transmitted by a mobile station, a temporary frame identity (TFI), wherein the TFI is assigned based on information in a channel reservation message that precedes a data frame transmitted by the mobile station, and the TFI assigned is unique among other TFIs assigned to data frames concurrently transmitted by other mobile stations;

including the assigned TFI in every data block in the data frame to which the TFI is assigned, wherein each data frame comprises a plurality of data blocks; and resuming transmission of an uncompleted data frame, wherein transmission was interrupted by an acknowledgment message erroneously transmitted by the mobile station, by the base station's transmitting a predetermined message that includes the TFI assigned to the uncompleted data frame.

15. The method of claim 14, wherein the predetermined message is a first data block of the uncompleted data frame.

16. In a mobile packet communications system using a reservation slotted-ALOHA protocol in which data frames are exchanged between a base station and mobile stations, a method of implementing automatic repeat request (ARQ), comprising the steps of:

assigning, to each data frame transmitted by a mobile station, a temporary frame identity (TFI), wherein the TFI is assigned based on information in a channel reservation message that precedes a data frame transmitted by the mobile station, and the TFI assigned is unique among other TFIs assigned to data frames concurrently transmitted by other mobile stations;

including the assigned TFI in every data block in the data frame to which the TFI is assigned, wherein each data frame comprises a plurality of data blocks; and resuming transmission of an uncompleted data frame transfer, wherein transmission was interrupted by an acknowledgment message erroneously transmitted by the base station, by the mobile station's carrying out the steps of: transmitting a random access request; receiving a channel reservation message; and sending a predetermined message that includes the TFI assigned to the uncompleted data frame.

17. The method of claim 16, wherein the predetermined message is a first data block of the uncompleted data frame.

18. The method of claim 16, wherein the mobile station includes an indication that a TFI is already assigned in the random access request.

* * * * *